Aug. 5, 1924.
E. E. WICKERSHAM
1,503,617
SELF LAYING TRACK MECHANISM
Filed May 26, 1920
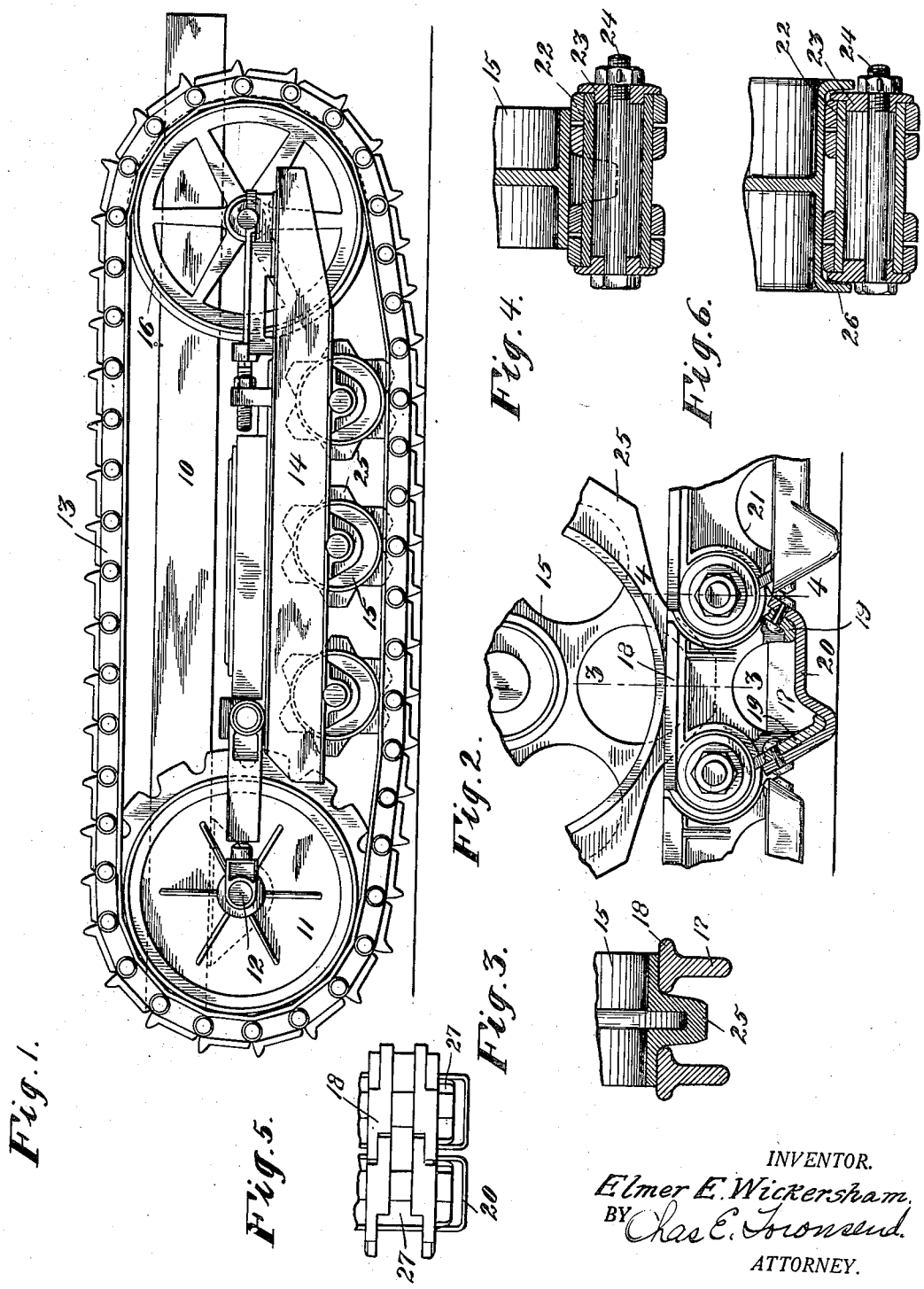
INVENTOR.
Elmer E. Wickersham,
BY Chas E. Townsend.
ATTORNEY.

Patented Aug. 5, 1924.

1,503,617

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-LAYING TRACK MECHANISM.

Application filed May 26, 1920. Serial No. 384,350.

*To all whom it may concern:*

Be it known that I, ELMER E. WICKERSHAM, a citizen of the United States, residing at Stockton, in the county of San Joaquin and State of California, have invented new and useful Improvements in Self-Laying Track Mechanism, of which the following is a specification.

This invention relates to self-laying track mechanisms and has for its object to improve and simplify the operation and construction of the track and supporting rollers which operate thereon.

The present invention comprises generally the provision of an endless flexible track made up of a series of articulated link sections, the side bars of which have openings or apertures for the egress of dirt and mud and in which adjacent links are connected together by rotating sleeves. The supporting rollers for the truck mechanism operate upon the ground run of the track and are provided with projections or teeth to fit between the side bars of the links whereby to prevent the rollers from running off the track and also to assist in forcing dirt out through the openings in the sides of the links. The sleeves in engagement with the teeth of the rollers are caused to rotate and thereby wear is distributed thereon.

In the accompanying drawing,

Fig. 1 shows a side elevation of a self-laying track unit embodying my invention.

Fig. 2 shows an enlarged detail of a portion of the track and supporting roller thereon.

Figs. 3 and 4 show detail sectional views taken on the lines 3—3 and 4—4 respectively of Fig. 2.

Fig. 5 shows a plan view of a portion of the track.

Fig. 6 shows a detail sectional view illustrating a modified arrangement of the supporting rollers.

In the present embodiment of the invention, I show a tractor main frame 10 at each side of which is a track laying unit, each unit comprising a sprocket driving wheel 11 journaled on an axle 12 carried by the main frame. An endless track 13 is shown arranged upon the driving sprocket wheel and within said track is a truck frame 14 carrying a series of rollers 15 operating upon the ground stretch of the track. An idler or guide wheel 16 for the forward portion of the track is shown journaled upon the truck frame 14.

The endless track is formed of a series of articulated link sections, each section comprising spaced side bars 17 with rail heads 18 formed at their inner longitudinal edges and with transverse webs 19 at the outer longitudinal edges forming means for attaching a corrugated shoe 20 in place thereon. The side bars are arched at 21 for the egress of mud and dirt.

The side bars of one end of each link are set out and notched interiorly to embrace the end of an adjacent link whose side bars are set inwardly and notched exteriorly as shown in Fig. 5. Adjacent links are secured together by a sleeve 22 passing through openings in the overlapping ends of the link sections and the sleeve is held in place by plugs 23 at each end connected across by a bolt 24. The fit of the sleeve is such that it is allowed to rotate freely in its bearings.

I prefer to form the truck rollers 15 with projections or teeth 25 to fit between the side bars of the links and extend down between adjacent sleeves 22 so that the rollers are kept from running off the track and any dirt between the sides of the links will be expelled through the openings 21 by the action of the teeth 25. The teeth 25 on the rollers are few in number and of slight inclination and on account of the sleeves being freely rotatable in their bearings, the teeth on the rollers will be cammed into place should they get out of register with the track links.

Where it is desired to employ truck rollers with outside flanges as shown in Fig. 6, the fastening bolts 24 may be eccentrically positioned on the plugs 23 so as to allow sufficient clearance at each side of the track for the flanges 26 of the truck roller.

Various changes in the construction and arrangement of the several parts may be employed without departing from the spirit of my invention as disclosed in the appended claims.

The link shown herein is of a novel construction in that neither side bar of the link has a bottom member except the shoe itself. The shoe is attached to downwardly extending flanges 27 which connect opposite side bars together. By arching each side bar of the link as shown at 21, an opening is provided through which mud and dirt will be forced by the teeth of the sprocket wheels and truck rollers. This construction will materially lessen the weight of the link without impairing the strength thereof.

Having thus described my invention, what I claim and desire to secure by Letters Patent is:

1. A track link comprising spaced side bars, each formed with a rail at its inner longitudinal edge, a downwardly extending flange at each end of the link connecting opposite side bars together, and a shoe connected to said flanges.

2. A track link as set forth in claim 1 wherein the side bars are arched at the bottom intermediate their ends leaving an opening above the shoe for the egress of dirt and mud.

In testimony whereof I have hereunto set my hand in the presence of two subscribing witnesses.

ELMER E. WICKERSHAM.

Witnesses:
W. W. HEALEY,
JOHN H. HERRING.